US007222202B2

(12) United States Patent
Sweet (10) Patent No.: US 7,222,202 B2
(45) Date of Patent: May 22, 2007

(54) METHOD FOR MONITORING A SET OF SEMAPHORE REGISTERS USING A LIMITED-WIDTH TEST BUS

(75) Inventor: Jim Sweet, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 250 days.

(21) Appl. No.: 10/800,454

(22) Filed: Mar. 15, 2004

(65) Prior Publication Data

US 2005/0182877 A1 Aug. 18, 2005

Related U.S. Application Data

(60) Provisional application No. 60/545,883, filed on Feb. 17, 2004.

(51) Int. Cl.
*G06F 12/00* (2006.01)
(52) U.S. Cl. .................. 710/200; 326/52; 710/307; 718/104
(58) Field of Classification Search ................ 326/52; 710/200, 307; 718/104
See application file for complete search history.

(56) References Cited

U.S. PATENT DOCUMENTS

| 4,286,321 | A | * | 8/1981 | Baker et al. | ................ 710/104 |
| 5,093,588 | A | * | 3/1992 | Ando et al. | ................ 326/86 |
| 5,155,854 | A | * | 10/1992 | Flynn et al. | ................ 718/104 |
| 5,590,159 | A | * | 12/1996 | Anderson | ................ 375/340 |
| 6,259,326 | B1 | * | 7/2001 | Dunlop et al. | ................ 331/2 |
| 6,421,312 | B1 | * | 7/2002 | Liao et al. | ................ 720/707 |
| 6,892,257 | B2 | * | 5/2005 | Grisenthwaite | ............. 710/200 |
| 2003/0005195 | A1 | * | 1/2003 | Davis et al. | ................ 710/200 |

OTHER PUBLICATIONS

Balch, Mark. Complete Digital Design—A comprehensive guide to digital electronics and computer system architecture. 2003. The McGraw-Hill Companies, Inc. p. 8.*
Camilleri, Nick. Status and Control Semaphore Registers Using Partial Reconfiguration. XILINX. Jun. 7, 1999. Version 1.0.*
Liu et al. Extending OpenMP for Heterogeneous Chip Multiprocessors. Institute for Scientific Computing, Wayne State University. Proceedings of the 2003 International Conference on Parallel Processing.*
Marshall, Joseph. Building Standards Based COTS Multiprocessor Computer Systems for Space Around a High Speed Serial Bus Network. Lockheed Martin Federal Systems. 1998.*

* cited by examiner

*Primary Examiner*—Matthew Spittle
(74) *Attorney, Agent, or Firm*—McAndrews Held & Malloy, Ltd.

(57) ABSTRACT

Certain embodiments of the invention may be found in a method and system for monitoring a set of semaphore registers using a limited-width test bus. Each semaphore register represents a separate hardware resource. The bits in a semaphore register are monitored jointly to determine whether the hardware resource it represents is in use by a software thread. The bits in the same register bit location of all the semaphore registers are monitored jointly to determine the ID number of the software thread currently using the hardware resource. The limited-width test bus comprises of bit lines representing each semaphore registers and bit lines representing the contents of the semaphore registers. Semaphore protocol steps are used in addition to changes monitored by the limited-width test bus to determine current usage of each hardware resource and to identify the ID number of the software thread using a hardware resource.

5 Claims, 6 Drawing Sheets

METHOD FOR MONITORING A SET OF SEMAPHORE REGISTERS USING A LIMITED-WIDTH TEST BUS

CROSS-REFERENCE TO RELATED APPLICATIONS/INCORPORATION BY REFERENCE

This application makes reference to, claims priority to, and claims the benefit of: U.S. Provisional Application Ser. No. 60/545,883 filed Feb. 17, 2004.

FIELD OF THE INVENTION

Certain embodiments of the invention relate to the sharing of hardware resources in a digital system. More specifically, certain embodiments of the invention relate to a method and system for monitoring a set of semaphore registers using a limited-width test bus.

BACKGROUND OF THE INVENTION

In integrated circuit (IC) designs, for example, registers are utilized to store information. Some integrated circuits or chips use special registers that are referred to as semaphore registers. These special registers or semaphore registers may be utilized for a plurality of different applications or operations. One application of semaphore registers may comprise the allocation of mutually exclusive accesses to hardware resources, for example, arithmetic units, communication ports, and memory units, that are generally shared among multiple software program tasks in a computerized system or among several processors. The software program tasks may be referred to as threads.

When debugging or verifying the operation of complex IC systems which use semaphore registers on a chip, it may be useful to have the capability to monitor the contents of the semaphore registers in order to track and identify which software thread is using a particular hardware resource. Such tracking provides verification that the software threads are accessing hardware resources in an efficient manner or in accordance with an appropriate protocol or schedule. Unfortunately, a complete set of semaphore registers will contain a large amount of data at any particular time, and it is difficult to make all that data observable on the pins of the chip in such a way that the contents of the registers can be monitored continuously and in real-time. In this context, real-time may refer to the fact that the chip may run at full speed without interruption, while the contents of its registers are being monitored.

A non-real-time solution would invoke stopping all normal activity on the chip and read all of the registers. This would provide a momentary snapshot of the contents, but it is not very useful because it does not provide the ability to monitor the contents continuously in real-time and at full speed. Continuous monitoring allows the IC system designer to verify that multi-threaded applications are running properly and efficiently under specified operating constraints. Another potential solution would be to attempt to monitor writes to the chip and try to deduce what is happening. However, since writes to semaphore registers generally operate independently, and in certain instances are ignored by the register hardware, knowing what was written to the chip does not necessarily indicate the resulting contents of the target register.

The exact implementation and behavior of semaphore registers may be system and/or application dependent. In general, semaphore registers are utilized to store an identifier or ID number of the software thread that is currently using the hardware resource. If the semaphore register value is logic 0 and the semaphore register default value or reset state is also logic 0, then the hardware resource that corresponds to that semaphore register is not in use. If the semaphore register value is not its default or reset value, then the semaphore register contains the ID number of the software thread that is using the hardware resource. A hardware resource can only be used by one thread at a time. In order to share a hardware resource among several software threads, a specific semaphore protocol may be defined to examine the contents of the semaphore register that corresponds to that hardware resource, to gain access to the hardware resource if available, and to subsequently release the hardware resource, for example. The semaphore protocol may also establish the reset state or default value of the semaphore registers.

Figure 1:
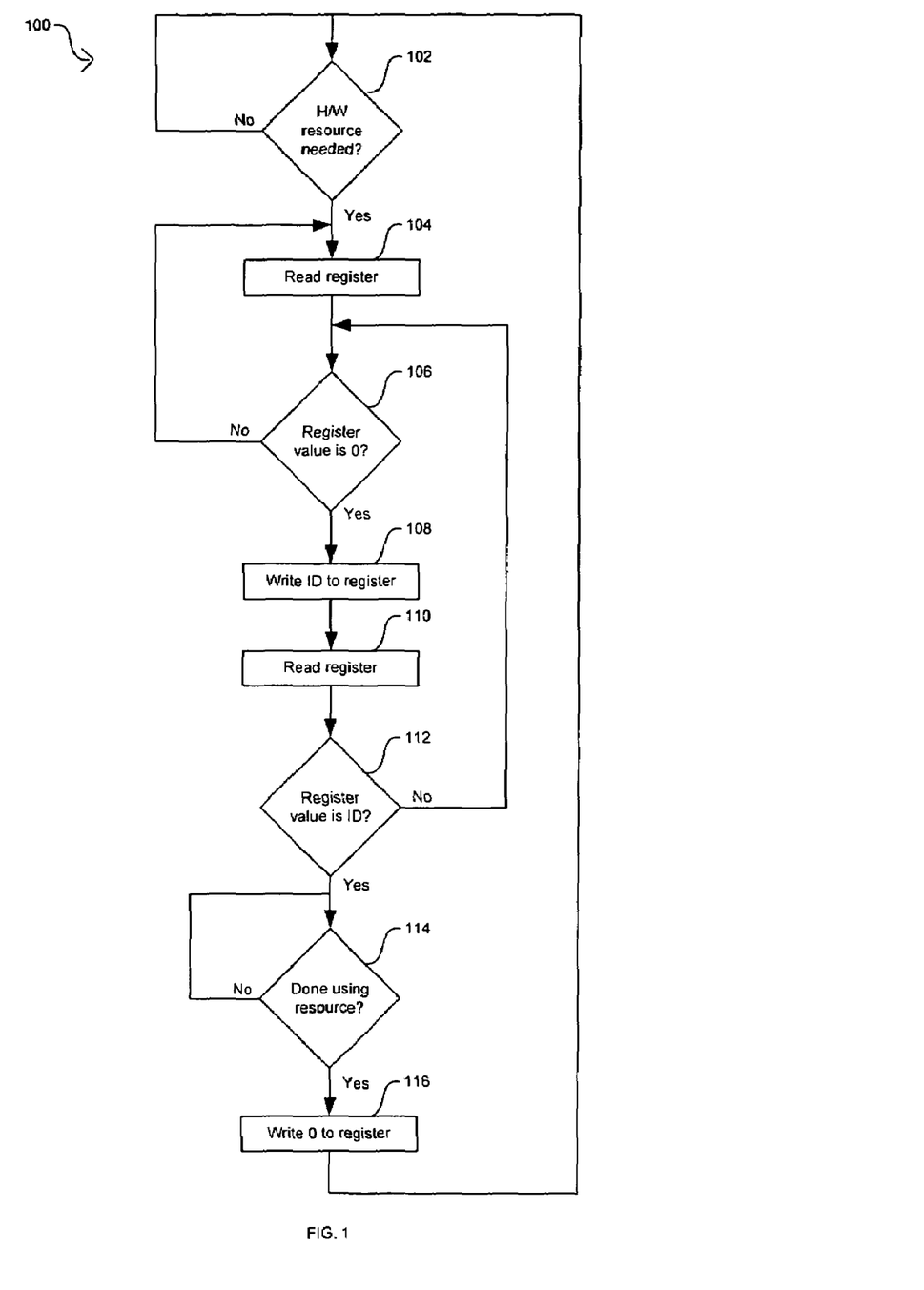
FIG. 1 contains a flow chart showing a process that a software thread may use to share a hardware resource.

FIG. 1 contains a flow chart showing a process that a software thread may use to share a hardware resource. Referring to FIG. 1, the flow chart 100 starts by determining in step 102 whether the hardware resource is needed by the software thread. If the hardware resource is not needed, then the software thread returns to step 102. Otherwise, the software thread proceeds to step 104 where it reads the contents of the semaphore register that corresponds to the hardware resource it needs to use. After reading the contents of the semaphore register, the software threads proceeds to step 106 where it determines whether the semaphore register is at logic 0. If the semaphore register value is not logic 0, then the hardware resource is in use and the software thread returns to step 104. If the semaphore register value is logic 0, then the hardware resource is available for use and the software thread can attempt to take ownership of the hardware resource and proceeds to step 108. In step 108 the software thread writes its ID number or identifier to the semaphore register and then proceeds to step 110. In step 110 the software thread reads the semaphore register value and proceeds to step 112. In step 112 the software thread determines whether the semaphore register value is its ID number or identifier. If the value read is not its ID number or identifier, then the software thread did not actually succeed in taking ownership of the hardware resource and returns to step 106. If the value read in step 110 is the ID number or identifier, then the software thread has successfully taken ownership of the hardware resource. If the hardware resource is in use by the software thread, then the software thread proceeds to step 114 where it determines whether it is done using the hardware resource. If it is not done, the software thread returns to step 114. If it is done using the hardware resource, then the software thread proceeds to step 116 where it writes the value logic 0 to the semaphore register that corresponds to the hardware resource. After writing to the semaphore register in step 116, the software thread returns to step 102.

Failure to gain ownership of a hardware resource that was available can happen if two software threads attempt to take ownership of the same hardware resource at about the same time. For example, assume that software thread 10 wants to use hardware resource AA. In this regard, software thread 10 reads the corresponding semaphore register AAreg for hardware resource AA to determine if the value is logic 0. If the hardware resource AA is in use, the value will not be 0, and the software thread 10 may poll the semaphore register, i.e. read it repeatedly, and wait for the value to read back a value of 0. When the value that is read is 0, it means the hardware resource is available and software thread 10 may attempt to take ownership. However, assume that software thread 20 was also polling semaphore register AAreg, and has also determined that the hardware resource AA is available and attempts to take ownership of hardware resource AA. Both software threads attempt to write to register AAreg. Software thread 10 writes a value of 10, and software thread 20 writes a value of 20 to semaphore register AAreg.

Depending on the system hardware, and the exact timing of the execution of the software threads, one of the write operations will happen before the other. For the purpose of this example, the write done by software thread 20 is assumed to occur first, followed immediately by the write done by software thread 10. When software thread 20's write occurs, the semaphore register value will change from 0 to 20. When the subsequent write done by software thread 10 occurs, the value of semaphore register AAreg does not change, and will retain the value of 20. This is the case because semaphore register protocol may require that the semaphore register value changes back to the reset state value before a new ID number or identifier can be written. This may require the use of specialized hardware. After both software threads do their writes, they each read the ID number or identifier stored in the semaphore register. It does not matter which read executes first. They will both read back a value of 20. Since the value matches the ID number of software thread 20, both software threads know that the hardware resource is now owned by software thread 20. Software thread 10 may not use the hardware resource, and may poll the semaphore register AAreg again to wait for hardware resource AA to once again become available. Software thread 20 may use hardware resource AA.

When software thread 20 is finished using hardware resource AA, it will write a value of 0 to semaphore register AAreg. Since software thread 10 has continued to poll semaphore register AAreg, it read a value of 0 and know that hardware resource AA is once again available. Software thread 10 can now write a 10 to the semaphore register, and then immediately read the semaphore register to check the value. This time, the value will be 10, and software thread 10 knows that it owns hardware resource AA. The process repeats as required. The process and behavioral concepts of the hardware may be the same independent of the number of resources and the number of threads attempting to simultaneously use them.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for monitoring a set of semaphore registers using a limited-width test bus. Access and availability of hardware resources may be critical in many software applications. Continuous or real-time monitoring of the use of hardware resources by multiple software threads can assist designers to debug and optimize complex IC systems. One aspect of the invention described herein provides a method for monitoring an arbitrarily large set of semaphore registers continuously and in real-time while using a relatively small number of pins on the chip to transmit the diagnostic data. The method for sharing hardware resources in a digital IC system may comprise determining whether a hardware resource is in use by monitoring contents in a semaphore register and determining from the contents in the semaphore register an ID number or identifier of a software thread that is using the hardware resource. The contents on the semaphore register may be accessed by a limited-width test bus, where a portion of the bus may be used to address each of the semaphore registers that corresponds to a hardware resource on chip, while the remaining portion of the bus may be used to address each of the register bit locations in the semaphore registers. The limited-width test bus does not contain enough bit lines to individually address each of the semaphore registers in the digital IC system. The contents on the limited-width test bus may be accessed internally by other components or blocks in the chip or externally by assigning pins on the chip to the bus.

When a semaphore protocol requires that a reset state or default value of the semaphore register be logic 0, the corresponding hardware resource may be determined to be in use if by ORing all the register bit locations in the semaphore register a logic 1 results. The ORing operation is carried out by at least one OR gate coupled to all the register bit locations of a semaphore register. The hardware usage determination may be monitored by coupling one OR gate to a bit line in the portion of the limited-width test bus that is used to address each of the semaphore registers that correspond to a hardware resource. If the semaphore protocol requires that the reset state or default value of the semaphore register be logic 1, the corresponding hardware resource may be determined to be in use if by ANDing all the register bit locations in the semaphore register a logic 0 results. The ANDing operation is carried out by at least one AND gate coupled to all the register bit locations of a semaphore register. The hardware usage determination may be monitored by coupling one AND gate to a bit line in the portion of the limited-width test bus that is used to address each of the semaphore registers that correspond to a hardware resource.

When determining an ID number of a software thread, all the register bits that correspond to the same register bit locations in each of the semaphore registers are XORed. For example, all the least significant bits in the semaphore registers are XORed together while all the most significant bits in the semaphore registers are XORed together. The XORing operation is carried out by at least one XOR gate coupled to all the register bits that correspond to the same register bit location. Monitoring the XORing operation for each register bit location may be done by coupling one XOR gate to a bit line in the portion of the limited-width test bus that is used to address each of the register bit locations in the semaphore registers. Tracking changes in the XORing operation for each register bit location may be used to determine the ID number of the software thread that is using the hardware resource. A processor may be used to track changes in the XORing operation and to determine the ID number of the software thread that is using the hardware resource. The first state of the XORing operation for each register bit location is known because all semaphore registers are reset to the same reset state or default value at the start of operation or by a hard reset during system operation. Determination of which hardware resource is in use and continuous tracking of any changes that occur in the XORing operation for each register bit location provide sufficient information to determine the software thread ID number.

In another aspect of the invention, semaphore registers may be grouped into semaphore register blocks when the number of semaphore registers is very large. Grouping of semaphore registers into semaphore register blocks may be based on operational or diagnostic considerations. For example, hardware resources with similar functionality may be grouped into at least one semaphore register block. Each semaphore register block may be accessed individually by the limited-width test bus. Selection of which semaphore register block to be accessed by the limited-width test bus may be done by a selector. A portion of the limited-width test bus may be assigned at least one bit line to select which semaphore register block to access.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for monitoring a set of semaphore registers using a limited-width test bus. Access and availability of hardware resources may be critical in many software applications. Continuous or real-time monitoring of the use of hardware resources by multiple software threads can assist designers to debug and optimize complex IC systems. One aspect of the invention described herein provides a method for monitoring an arbitrarily large set of semaphore registers continuously and in real-time while using a relatively small number of pins on the chip to transmit the diagnostic data. The method for sharing hardware resources in a digital IC system may comprise determining whether a hardware resource is in use by monitoring contents in a semaphore register and determining from the contents in the semaphore register an ID number or identifier a software thread that is using the hardware resource. The contents on the semaphore register may be accessed by a limited-width test bus, where a portion of the bus may be used to address each of the semaphore registers that corresponds to a hardware resource on chip, while the remaining portion of the bus may be used to address each of the register bit locations in the semaphore registers. The limited-width test bus does not contain enough bit lines to individually address each of the semaphore registers in the digital IC system. The contents on the limited-width test bus may be accessed internally by other components or blocks in the chip or externally by assigning pins on the chip to the bus.

Figure 2A:
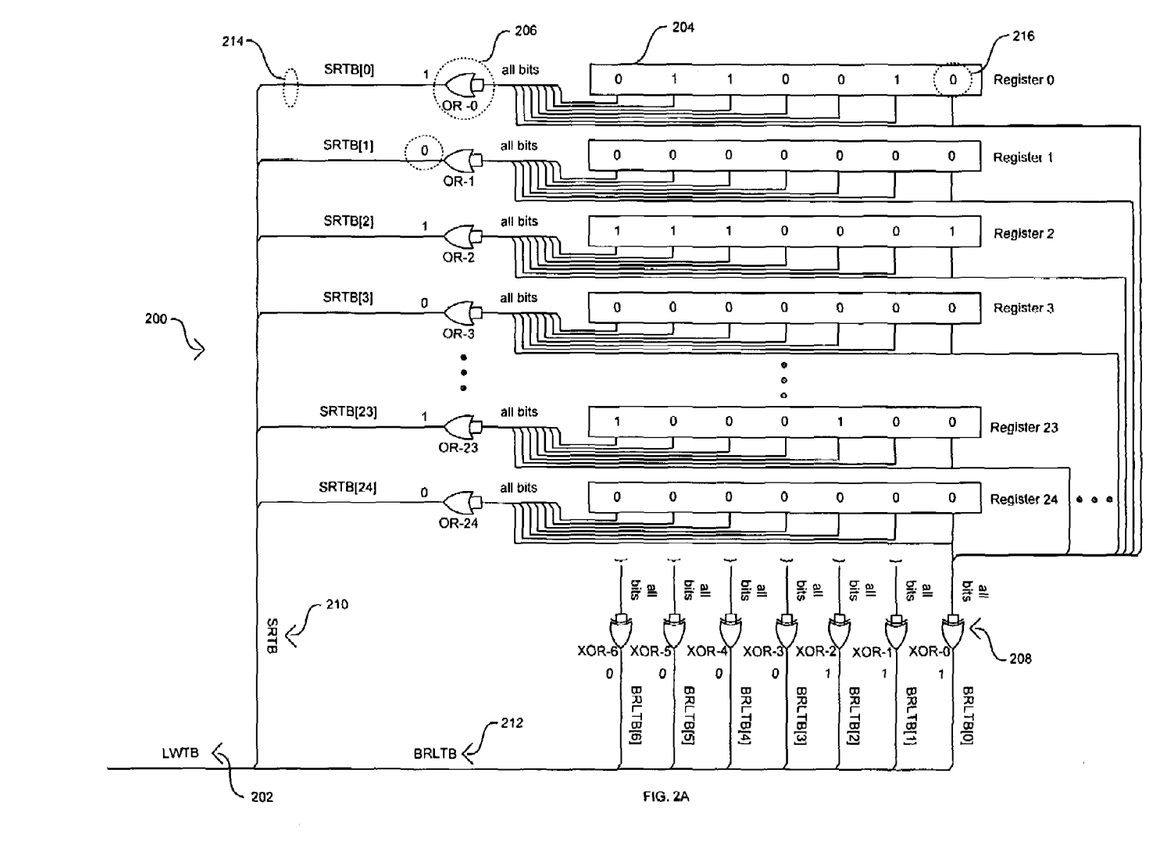
FIG. 2A is a diagram of an exemplary system at time T1 that may be utilized for monitoring a set of semaphore registers using a limited-width test bus, in accordance with an embodiment of the invention.

FIG. 2A is a diagram of an exemplary system at time T1 that may be utilized for monitoring a set of semaphore registers using a limited-width test bus, in accordance with an embodiment of the invention. Referring to FIG. 2A, the exemplary system 200 comprises a limited-width test bus (LWTB) 202, a plurality of semaphore registers 204, a plurality of multiple-input OR gates 206, and a plurality of multiple-input XOR gates 208. The LTWB 202 comprises a semaphore register test bus (SRTB) 210 and a bit register location test bus (BRLTB) 212. The SRTB 210 and the BRLTB 212 each comprises a plurality of bit lines 214. The semaphore register 204 comprises a plurality of bit register locations 216.

The LWTB 202 may be used to monitor the contents inside the semaphore registers 204. The LWTB 202 may be connected to other digital blocks on the chip or to pins for external monitoring. A portion of the LWTB 202 may be assigned to address each of the semaphore registers 204 while the remaining portion of the LWTB 202 may be assigned to address each of the register bit locations 216 in the semaphore registers 204. The portion that addresses each of the semaphore registers 204 is the SRTB 210 and it may comprise at least as many bit lines 214 as there are semaphore registers 204. The remaining portion of the LTWB 202 is the BRLTB 212 and it may comprise at least as many bit lines 214 as there are register bit locations 216.

The semaphore registers 204 may be used to store a reset state or default value or to store the ID number or identifier of the software thread that is using the hardware resource. The reset state or default value is set by a semaphore register protocol selected for use in the exemplary system 200. The semaphore registers 204 may comprise at least as many register bit locations 216 as necessary to store the ID numbers of all the possible software threads that may use the hardware resource in addition to the state reset or default value.

The multiple-input OR gates 206 may be used to determine if a hardware resource is in use by ORing the register bit locations 216 of a semaphore register 204. The multiple-input OR gate 206 may have at least as many inputs as there are register bit locations 216 in a semaphore register 204. The inputs of the multiple-input OR gate 206 are coupled to the register bit locations 216 in a semaphore register 204. The multiple-input OR gate 206 may comprise a plurality of logic gates to perform the ORing operation. The output of the multiple-input OR gate 206 is coupled to a bit line 214 in the SRTB 210.

The multiple-input XOR gates 208 may be used to determine the ID number of the software thread that is using the hardware resource by XORing corresponding register bit locations 216 of each semaphore register 204. The multiple-input XOR gate 206 may have at least as many inputs as there are semaphore registers 204 in the exemplary system 200. The inputs of the multiple-input XOR gate 208 are coupled to corresponding register bit locations 216 in each semaphore register 204. The multiple-input XOR gate 208 may comprise a plurality of logic gates to perform the XORing operation. The output of the multiple-input XOR gate 208 is coupled to a bit line 214 in the BRLTB 212.

For purposes of illustration, the exemplary system 200 may correspond to a case when the IC system design is comprised of 25 hardware resources and 127 software threads. In such a case, 25 hardware resources have 25 corresponding semaphore registers 204. There are 25 multiple-input OR gates 206, one for each of the 25 semaphore registers 204. The SRTB 210 comprises of 25 bit lines 214, labeled SRTB[0] through SRTB[24] in FIG. 2A, one for each of the 25 multiple-input OR gates 206. The least significant bit of the SRTB 210 corresponds to the semaphore register 204 labeled Register 0. The most significant bit of the SRTB 210 corresponds to the semaphore register 204 labeled Register 24. The semaphore register 204 may store 128 possible words or unique states, 127 unique states for each of the software threads in addition to a reset state or default value. To store 128 possible unique states the semaphore register 204 comprises 7 register bit locations 216. There are 7 multiple-input XOR gates 208, one for each of the 7 bit register locations 216 in the semaphore register 204. The BRLTB 212 comprises of 7 bit lines 214, labeled BRLTB[0] through BRLTB[6] in FIG. 2A, one for each of the 7 multiple-input XOR gates 208. The least significant bit of the BRLTB 212 may correspond to the least significant bit of the semaphore registers 204. The most significant bit of the BRLTB 212 may correspond to the most significant bit of the semaphore registers 204. The LWTB 202 comprises 32 bit lines 214, 25 bit lines 214 for the SRTB 210 and 7 bit lines 214 for the BRLTB 212. The SRTB 210 may map to the lowest 25 bit lines 214 in the LWTB 202 and the BRLTB 212 may map to the highest 7 bit lines 214 in the LWTB 212.

This illustrative configuration of exemplary system 200 has 7 bits in each of 25 semaphore registers 204 for a total of 175 bits. The number of possible unique states that may be stored in the semaphore registers 204 of the illustrative configuration of exemplary system 200 is $2^{175}$. The LWTB 202 only has $2^{32}$ possible unique states that it can access or address. By monitoring changes in LWTB 202 over time, the exemplary system 200 may determine any of the $2^{175}$ unique states in the semaphore registers 204.

In operation, the exemplary system 200 may utilize, for example, three dimensions to monitor the semaphore registers 204. Conceptually, the exemplary system 200 may look at rows, where each row may be a single semaphore register 204, look at columns where each column may comprise corresponding register bit locations 216 in each semaphore register 204, and an added dimension, which may be time. The instance shown in FIG. 2A corresponds to time T1 in the operation of exemplary system 200. In this regard, the exemplary system 200 may be adapted to monitor changes that may occur over time, and utilizes this information to determine hardware resource usage and software thread ID number. The semaphore registers 204 may be utilized with a specific semaphore protocol that limits their behavior and restricts transitions between states. Hence, the possible ways in which the values in semaphore register 204 may change are limited. At least some of these limitations in the semaphore protocol may be adapted to ignore certain cases which might otherwise appear the same and cause ambiguity, but may never actually occur due to the nature of the semaphore protocol.

The semaphore protocol may allow the following list of assumptions or rules to be made, for example. These assumptions or rules may be utilized to assist in determining the values in the semaphore registers 204. These assumptions or rules may be valid as long as the semaphore protocol and required behavior are followed. In one assumption or rule, all registers start with a reset state or default value of logic 0, which may occur normally upon a hardware reset. In another assumption or rule, only one semaphore register 204 may change values at a time, which may be normal behavior for hardware registers that are individually written.

In another assumption or rule, if a semaphore register 204 contains a non-zero value, and the value changes, the new value will be zero.

Referring back to FIG. 2A, at time instant T1, the exemplary system 200 has a unique set of states or values stored in its semaphore registers 204. For example, the semaphore register 204 labeled Register 1 is set to logic 0. All the bits of semaphore register 204 labeled Register 1 are coupled to the multiple-input OR gate 206 labeled OR-1. The output of the multiple-input OR gate 206 labeled OR-1 is logic 0, which indicates that the hardware resource corresponding to the semaphore register 204 labeled Register 1 is available. Any non-zero value would indicate that the hardware resource is in use. The value of the multiple-input OR gate 206 labeled OR-1 is monitored by SRBT 210 and therefore by the LWTB 202. Similarly, the outputs of all other multiple-input OR gates 206 are monitored by SRBT 210 and therefore by the LWTB 202.

Also at time instant T1, the most significant bits of each semaphore register 204 in the exemplary system 200 is coupled to the multiple-input XOR gate 208 labeled XOR-6. Similarly, all other corresponding register bit locations 212 are also coupled to multiple-input XOR gates 208. The values on each of the 7 multiple-input XOR gates 208 are indicative of time instant T1 and are monitored by BRLTB 212 and therefore by the LWTB 202.

Figure 2B:
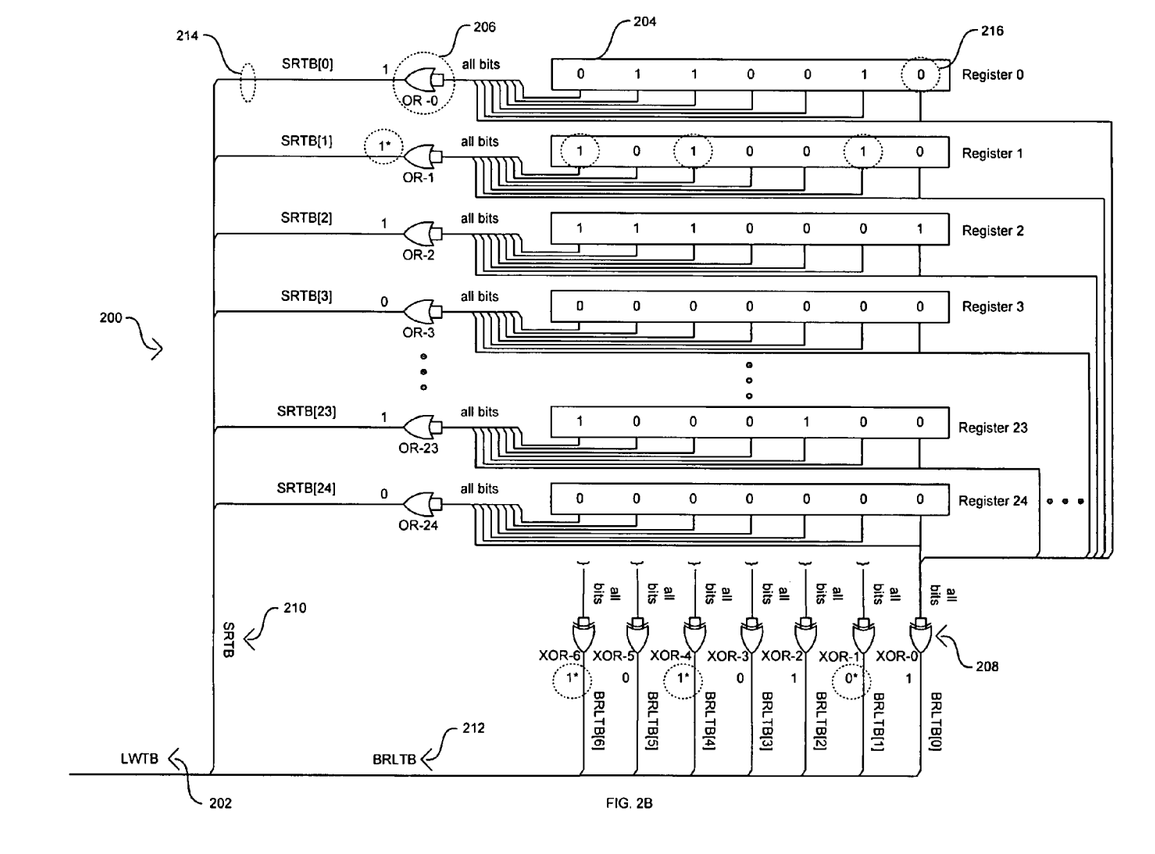
FIG. 2B is a diagram of an exemplary system at time T2 that may be utilized for monitoring a set of semaphore registers using a limited-width test bus, in accordance with an embodiment of the invention.

FIG. 2B is a diagram of an exemplary system at time T2 that may be utilized for monitoring a set of semaphore registers using a limited-width test bus, in accordance with an embodiment of the invention. While any one time instant is indicative of which hardware resources are in use, only monitoring changes can provide sufficient information to determine the ID number of the software thread using the hardware resource. Referring to FIG. 2B, at time instant T2, a software thread has taken ownership of the hardware resource corresponding to semaphore register 204 labeled Register 1. The software thread has written its ID number into the register which change the value of 3 register bit locations 216 in semaphore register 204 labeled Register 1. The output of the multiple-input OR gate 206 labeled OR-1 has changed from a value of logic 0 to a value of logic 1 to indicate that the corresponding hardware resource is now in use. The outputs of multiple-input XOR gates 206 labeled XOR-6, XOR-4, and XOR-1 have also changed values. Because the previous value in semaphore register 204 labeled Register 1 was logic 0, and since only one semaphore register 204 can change at a time according to the semaphore protocol assumptions, the changes in the outputs of multiple-input XOR gates 206 labeled XOR-6, XOR-4, and XOR-1 indicate that the corresponding register bit locations 214 have changed from logic 0 to logic 1. Assuming all the previous values of all the registers are known, then knowing which bits of which semaphore register 204 have changed may be enough information to update the known values of the registers. The assumption that the previous values of all the semaphore registers 204 are known may be made because the semaphore registers 204 initially started off in their reset state.

Figure 2C:
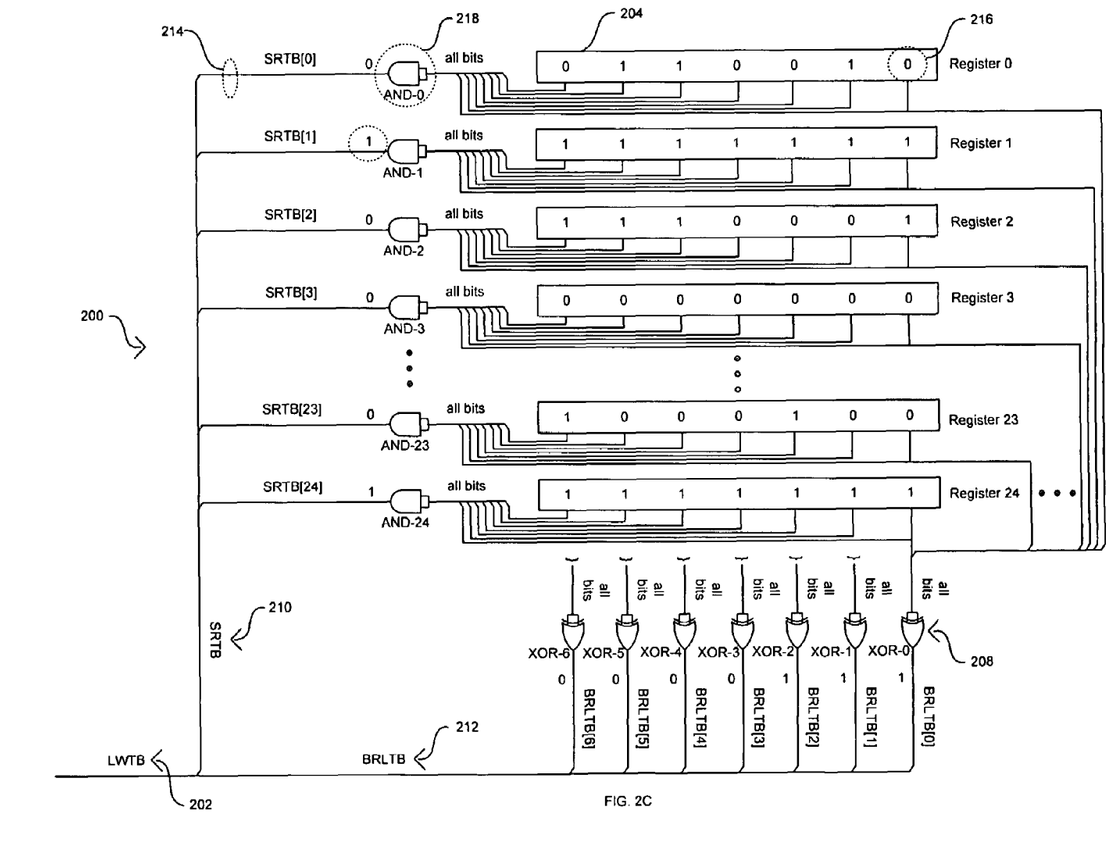
FIG. 2C is a diagram of an exemplary system that may be utilized for monitoring blocks of semaphore registers using a limited-width test bus, in accordance with an embodiment of the invention.

FIG. 2C is a diagram of an exemplary system that may be utilized for monitoring blocks of semaphore registers using a limited-width test bus, in accordance with an embodiment of the invention. In another embodiment of the invention, when the semaphore protocol requires that the reset state or default value of the semaphore registers 204 be logic 1, then the multiple-input OR gates 206 in FIG. 2A and FIG. 2B may be replaced by a multiple-input AND gate 218. In this instance semaphore register 204 labeled Register 1 is set to logic 1. All the bits of semaphore register 204 labeled Register 1 are coupled to the multiple-input AND gate 218 labeled AND-1. The output of the multiple-input AND gate 218 labeled AND-1 is logic 1, which indicates that the hardware resource corresponding to the semaphore register 204 labeled Register 1 is available. A zero value would indicate that the hardware resource is in use. The value of the multiple-input AND gate 218 labeled AND-1 is monitored by SRBT 210 and therefore by the LWTB 202. Similarly, the outputs of all other multiple-input AND gates 218 are monitored by SRBT 210 and therefore by the LWTB 202.

Figure 3:
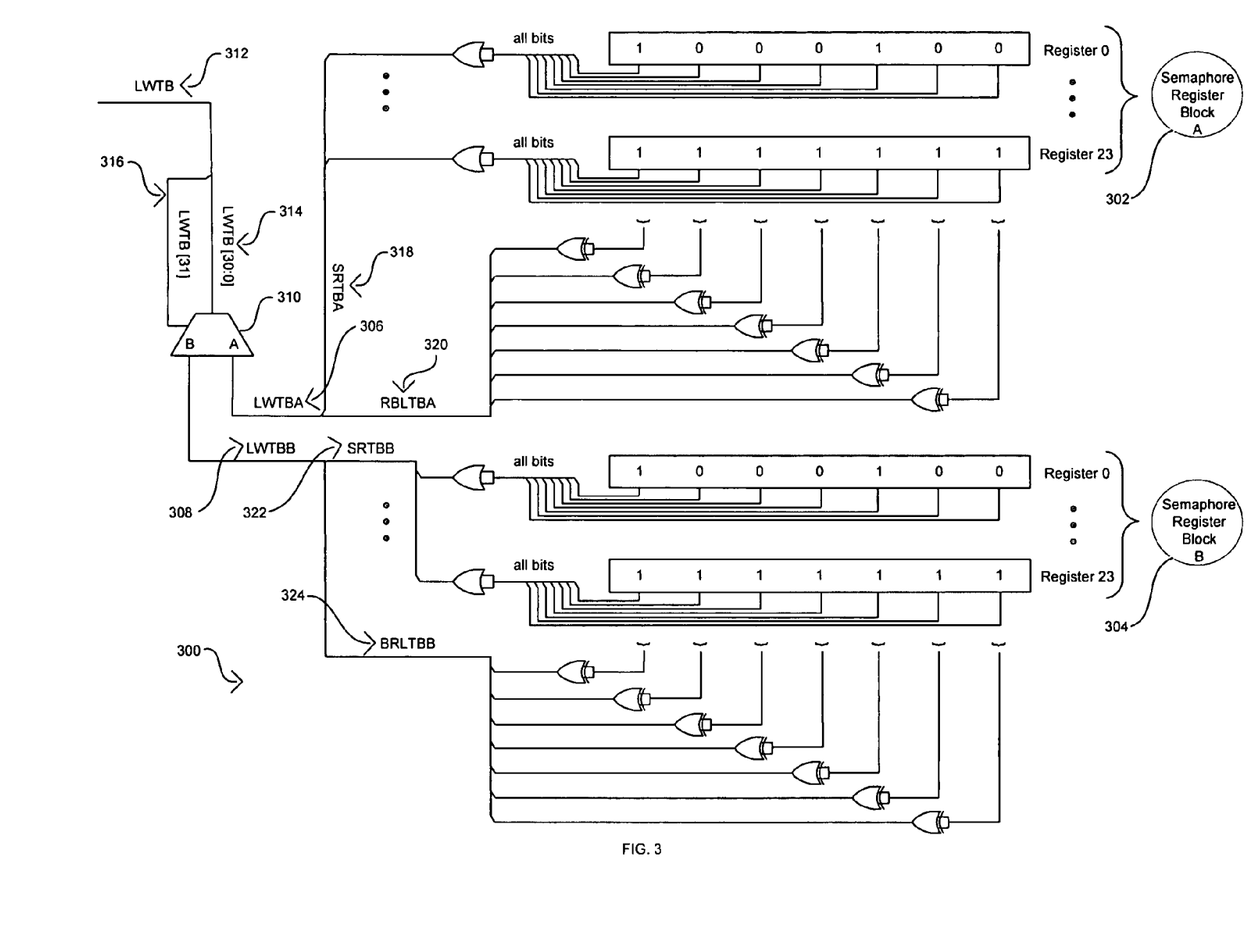
FIG. 3 is a diagram of an exemplary system for grouping semaphore registers into semaphore register blocks, in accordance with an embodiment of the invention.

FIG. 3 is a diagram of an exemplary system for grouping semaphore registers into semaphore register blocks. The exemplary system 300 may comprise a semaphore register block A 302, a semaphore register block B 304, a limited-width test bus for block A (LWTBA) 306, a limited-width test bus for block B (LWTBB) 308, a selector 310, and a limited-width test bus (LWTB) 312. The LWTB 312 may comprise a LWTB[30:0] 314 and a LWTB [31] 316. The LWTBA 306 may comprise a semaphore register test bus for block A (SRTBA) 318 and a bit register location test bus for block A (BRLTBA) 320. The LWTBB 308 may comprise a semaphore register test bus for block B (SRTBB) 322 and a bit register location test bus for block B (BRLTBB) 324.

The semaphore register block A 302 may comprise a plurality of semaphore registers 204. The number of semaphore registers 204 in the semaphore register block A 302 may be determined by operational or diagnostic considerations. The semaphore register block B 304 may comprise a plurality of semaphore registers 204. The number of semaphore registers 204 in the semaphore register block B 304 may be determined by operational or diagnostic considerations.

The LWTBA 306 may be used to monitor the contents inside the semaphore registers 204 in semaphore register block A 302. A portion of the LWTBA 306 may be assigned to address each of the semaphore registers 204 in semaphore register block A 302 while the remaining portion of the LWTBA 306 may be assigned to address each of the register bit locations 216 in the semaphore registers 204 in semaphore register block A 302. The portion that addresses each of the semaphore registers 204 is the SRTBA 318 and it may comprise at least as many bit lines 214 as there are semaphore registers 204 in semaphore register block A 302. The remaining portion of the LTWBA 306 is the BRLTBA 320 and it may comprise at least as many bit lines 214 as there are register bit locations 216.

The LWTBB 308 may be used to monitor the contents inside the semaphore registers 204 in semaphore register block B 304. A portion of the LWTBB 308 may be assigned to address each of the semaphore registers 204 in semaphore register block B 304 while the remaining portion of the LWTBB 308 may be assigned to address each of the register bit locations 216 in the semaphore registers 204 in semaphore register block B 304. The portion that addresses each of the semaphore registers 204 is the SRTBB 322 and it may comprise at least as many bit lines 214 as there are semaphore registers 204 in semaphore register block B 304. The remaining portion of the LTWBB 308 is the BRLTBB 324 and it may comprise at least as many bit lines 214 as there are register bit locations 216.

The LWTB 312 may be used to monitor the contents in the semaphore registers 204 inside the semaphore register block A 302 and inside the semaphore register block B 304. As illustration the LTWB 312 is considered to be a 32-bit wide bus. The LWTB[30:0] 314 is a 31-bit wide portion of the LTWB 312 used to access the contents of semaphore register block A 302 and semaphore register block B 304. The LWTB [31] 316 is a bit line used to determine whether semaphore register block A 302 or semaphore register block B 304 will be selected. The LWTB[30:0] 314 and the LTWB[31] 312 may comprise a plurality of bit lines 214.

The selector 310 may be used to select between monitoring the contents of the semaphore registers 204 inside the semaphore register block A 302 or those inside the semaphore register block B 304. The LWTB[31] 312, in this illustrative example, may be used to select between the two blocks of semaphore registers 204. The selector 310 may comprise a plurality of inputs.

In operation, the LWTB[31] 312 bit line selects between monitoring the contents of the semaphore registers 204 inside the semaphore register block A 302 or those inside the semaphore register block B 304. Semaphore protocols in either block may be different based on operational or diagnostic considerations. Embodiments of either block may be different based on operational or diagnostic considerations.

Figure 4:
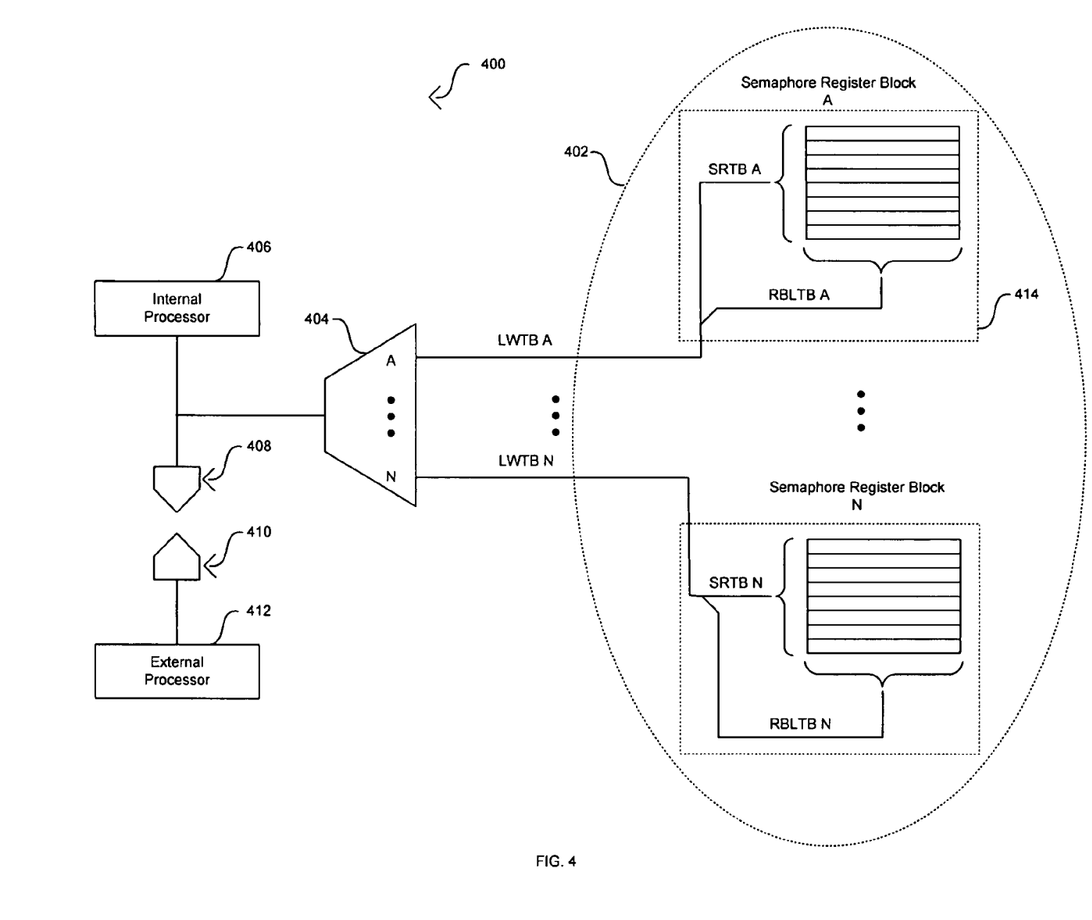
FIG. 4 is a diagram of an exemplary system that may be utilized for tracking contents of semaphore registers using a processor, in accordance with an embodiment of the invention.

FIG. 4 is a diagram of an exemplary system that may be utilized for tracking contents of semaphore registers using a processor, in accordance with an embodiment of the invention. The exemplary system 400 may comprise a bank of semaphore register blocks 402, a multiple-input selector 404, an internal processor 408, a set of output pins on the chip 410, a set of input pins in an external device 412, and an external processor 414.

The bank of semaphore register blocks 402 may comprise a plurality of semaphore register blocks 414. Each semaphore register block may comprise a plurality of semaphore registers 204. In this illustrative example, the semaphore register blocks 414 are labeled A through N.

The multiple-input selector 404 may be used to select among the plurality of semaphore register blocks 414 in the bank of semaphore register blocks 402. Selection may be made by at least one bit line 214 in the LWTB 202 or by other signal.

The internal processor 406 may be used to track or monitor the contents of the semaphore registers 204 which have been selected for monitoring. The internal processor 406 may be used to determine whether a hardware resource is in use. The internal processor 406 may be used to determine the ID number or identifier of the software thread that is using the hardware resource. The internal processor 406 may be used to determine which semaphore register block 402 to select for monitoring.

The set of output pins on the chip 408 and the set of input pins in an external device 410 may be used to monitor the contents of the semaphore registers 204 which have been selected for monitoring from outside the chip.

The external processor 412 may be used to track or monitor the contents of the semaphore registers 204 which have been selected for monitoring. The external processor 412 may be used to determine whether a hardware resource is in use. The external processor 412 may be used to determine the ID number or identifier of the software thread that is using the hardware resource. The external processor 412 may be used to determine which semaphore register block 402 to select for monitoring.

In operation, the internal processor 406 or the external processor 412 determines which semaphore register block 414 in the bank of semaphore register blocks 402 to select for monitoring. A signal is sent to the multiple-input selector 404 for the selection to take place. If the internal processor 406 is tracking or monitoring changes in the contents of the semaphore registers 204, then the determination of hardware resource usage and the ID number of the software thread may be carried out by the internal processor 406. If the external processor 412 is tracking or monitoring changes in the contents of the semaphore registers 204, then the contents are sent to the external processor 412 through the set of output pins on the chip 408 to the set of input pins in an external device 410 and the determination of hardware resource usage and the ID number of the software thread may be carried out by the external processor 412.

As stated before, even though a specific configuration example was used to explain the concepts, these same concepts would also apply for another configuration that had a different number of registers and/or a different number of threads. The width of the test bus (or more precisely, the width of each of the two sections of the test bus) would need to be adjusted accordingly.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for sharing hardware resources in a digital system, the method comprising:
    determining whether a hardware resource is in use by monitoring contents of at least one of a plurality of semaphore registers;
    accessing said monitored contents of said plurality of semaphore registers by using a limited-width test bus whose bus width contains less than a number of bits needed to individually address each of said plurality of semaphore registers; and
    XORing corresponding register bit locations in each one of said plurality of semaphore registers.

2. A method for sharing hardware resources in a digital system, the method comprising:
    determining whether a hardware resource is in use by monitoring contents of at least one of a plurality of semaphore registers;
    accessing said monitored contents of said plurality of semaphore registers by using a limited-width test bus whose bus width contains less than a number of bits needed to individually address each of said plurality of semaphore registers;
    XORing corresponding register bit locations in each one of said plurality of semaphore registers; and
    addressing each one of said register bit locations by coupling at least one XOR gate utilized for said XORing to a bit line in said limited-width test bus.

3. A method for sharing hardware resources in a digital system, the method comprising:
    arranging a plurality of semaphore registers into a plurality of semaphore register blocks;
    selecting one of said plurality of semaphore register blocks to be accessed by a limited-width test bus; and
    determining a software thread identifier by XORing corresponding register bit locations in each one of said plurality of semaphore registers.

4. A system for sharing hardware resources in a digital system, the system comprising:
    a plurality of hardware resources;
    a plurality of semaphore registers coupled to said plurality of hardware resources; and
    a limited-width test bus coupled to said plurality of semaphore registers, wherein said limited-width test bus contains less than a number of bits needed to individually address each of said plurality of semaphore registers and corresponding register bit locations in each one of said plurality of semaphore registers are coupled to an XOR gate.

5. A system for sharing hardware resources in a digital system, the system comprising:
    a plurality of hardware resources;
    a plurality of semaphore registers coupled to said plurality of hardware resources; and
    a limited-width test bus coupled to said plurality of semaphore registers, wherein said limited-width test bus contains less than a number of bits needed to individually address each of said plurality of semaphore registers, corresponding register bit locations in each one of said plurality of semaphore registers are coupled to an XOR gate, and each said XOR gate is coupled to a bit line in said limited-width test bus.

* * * * *